US011178287B1

(12) United States Patent
Zappaterra et al.

(10) Patent No.: US 11,178,287 B1
(45) Date of Patent: Nov. 16, 2021

(54) USE OF A SINGLE CHANNEL FOR VOICE COMMUNICATIONS AND MULTIPLE CHANNELS FOR NON-VOICE COMMUNICATIONS

(71) Applicant: Sprint Spectrum L.P., Overland Park, KS (US)

(72) Inventors: Luca Zappaterra, Arlington, VA (US); Yu Zhou, Herndon, VA (US); Muhammad A. Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 128 days.

(21) Appl. No.: 14/871,208

(22) Filed: Sep. 30, 2015

(51) Int. Cl.
*H04M 15/00* (2006.01)
*H04W 72/04* (2009.01)
*H04L 12/701* (2013.01)
*H04W 40/02* (2009.01)

(52) U.S. Cl.
CPC ............ *H04M 15/56* (2013.01); *H04L 45/00* (2013.01); *H04W 40/02* (2013.01); *H04W 72/0406* (2013.01); *Y02D 30/70* (2020.08)

(58) Field of Classification Search
CPC ............. H04M 15/56; H04W 72/0406; H04W 74/0808; H04W 76/20; H04B 1/0003; H04B 1/0092; H04L 45/00; H04Q 11/0471
See application file for complete search history.

(56) References Cited

U.S. PATENT DOCUMENTS

| | | | |
|---|---|---|---|
| 5,583,869 A | 12/1996 | Grube et al. | |
| 5,892,794 A * | 4/1999 | Siegers | H04W 76/20 375/219 |
| 5,905,903 A * | 5/1999 | Mizuta | H04Q 11/0471 712/1 |
| 6,721,569 B1 | 4/2004 | Hashem et al. | |

(Continued)

FOREIGN PATENT DOCUMENTS

EP 2385653 9/2011

OTHER PUBLICATIONS

First Action Interview Pilot Program Pre-Interview Communication from U.S. Appl. No. 14/575,455, dated Sep. 9, 2016.

(Continued)

*Primary Examiner* — Vinncelas Louis

(57) ABSTRACT

Disclosed are methods and systems to facilitate use of a single channel for voice communications and of multiple channels for non-voice communications. In particular, a transmitting node may determine that data is to be communicated from the transmitting node to a receiving node and may then make a determination of whether the data is to be communicated as part of a voice communication. If the determination is that the data is not to be communicated as part of a voice communication, then the transmitting node may responsively communicate the data to the receiving node over two or more channels. Whereas, if the determination is that the data is to be communicated as part of a voice communication, then the transmitting node may responsively communicate the data to the receiving node over just one channel rather than communicating the data to the receiving node over two or more channels.

20 Claims, 6 Drawing Sheets

(56) References Cited

U.S. PATENT DOCUMENTS

| | | | |
|---|---|---|---|
| 9,107,200 B1 | 8/2015 | Naim et al. | |
| 2002/0061753 A1* | 5/2002 | Lysejko | H04L 45/00 455/450 |
| 2006/0221939 A1 | 10/2006 | Rosen et al. | |
| 2006/0233188 A1 | 10/2006 | Oliver et al. | |
| 2007/0105576 A1 | 5/2007 | Gupta et al. | |
| 2007/0266157 A1* | 11/2007 | Xhafa | H04W 74/0808 709/225 |
| 2008/0013480 A1 | 1/2008 | Kapoor et al. | |
| 2008/0026696 A1* | 1/2008 | Choi | H04M 1/6066 455/41.3 |
| 2008/0254833 A1 | 10/2008 | Keevill et al. | |
| 2009/0052500 A1* | 2/2009 | Bush | H04B 1/0092 375/145 |
| 2010/0093281 A1 | 4/2010 | Khanka et al. | |
| 2010/0309930 A1 | 12/2010 | Harrison et al. | |
| 2012/0252477 A1 | 10/2012 | Rao | |
| 2012/0281536 A1 | 11/2012 | Gell et al. | |
| 2012/0282942 A1 | 11/2012 | Uusitalo et al. | |
| 2013/0010709 A1 | 1/2013 | Earnshaw et al. | |
| 2013/0010711 A1 | 1/2013 | Larsson et al. | |
| 2013/0039302 A1 | 2/2013 | Miki et al. | |
| 2013/0083661 A1 | 4/2013 | Gupta | |
| 2013/0109372 A1 | 5/2013 | Ekici | |
| 2014/0170990 A1 | 6/2014 | Black et al. | |
| 2015/0063151 A1 | 3/2015 | Sadek | |
| 2015/0135241 A1 | 5/2015 | Stoller | |
| 2015/0305011 A1 | 10/2015 | Bergstrom et al. | |
| 2016/0066177 A1* | 3/2016 | Natarahjan | H04W 8/186 370/312 |

OTHER PUBLICATIONS

First Action Interview—Office Action from U.S. Appl. No. 14/575,428, dated Apr. 24, 2017.
First Action Interview Pilot Program Pre-Interview Communication from U.S. Appl. No. 14/575,428, dated Dec. 16, 2016.
Final Office Action from U.S. Appl. No. 14/575,428, dated Oct. 6, 2017.
First Action Interview—Office Action from U.S. Appl. No. 14/575,455, dated Dec. 15, 2016.
U.S. Appl. No. 14/575,455, filed Dec. 18, 2014.
U.S. Appl. No. 14/507,128, filed Oct. 6, 2014.
U.S. Appl. No. 14/575,428, filed Dec. 18, 2014.
"Carrier Aggregation—Activation and Deactivation of Secondary Calls", How LTE Stuff Works, printed from the World Wide Web, dated Oct. 17, 2014.
First Action Interview Pilot Program Pre-Interview Communication from U.S. Appl. No. 15/063,758, dated Sep. 14, 2017.

* cited by examiner

USE OF A SINGLE CHANNEL FOR VOICE COMMUNICATIONS AND MULTIPLE CHANNELS FOR NON-VOICE COMMUNICATIONS

BACKGROUND

Unless otherwise indicated herein, the description provided in this section is not itself prior art to the claims and is not admitted to be prior art by inclusion in this section.

In a wireless communication system that implements carrier sense multiple access with collision avoidance (CSMA/CA), when a transmitting node has data to send to a receiving node on a shared wireless channel, the transmitting node will first listen to the channel for a certain interval to determine whether another node is transmitting on the channel, and the transmitting node will then transmit only if it thereby determines that the channel is idle. Once the transmitting node then transmits its data to the receiving node, the receiving node will then send an acknowledgement (ACK) message on the channel to the transmitting node.

While such a system may work well in some situations, the system can also suffer from a problem known as the "hidden node" problem. The hidden node problem arises when a neighboring node is within range of the receiving node but is not within range of the transmitting node and where the neighboring node transmits on the channel. In such a scenario, the transmitting node would be unable to hear transmission from the neighboring node on the channel and may therefore conclude that the channel is idle, but the neighboring node's transmission on the channel may make it impossible for the receiving node to receive transmission from the transmitting node on the channel.

To help overcome the hidden node problem, the transmitting and receiving nodes can engage in a handshake process on the channel before the transmitting node transmits the data to the receiving node, to ensure that transmitting and receiving nodes are able to communicate with each other on the channel. In accordance with the handshake process, once the transmitting node determines that the channel is idle, the transmitting node would transmit a "ready-to-send" (RTS) message on the channel to the receiving node, to indicate that the transmitting node is ready to send data to the receiving node. If the receiving node successfully receives that RTS message from the transmitting node, the receiving node would then respond by transmitting a "clear-to-send" (CTS) message on the channel, which would indicate to the transmitting node that the transmitting node may proceed with the data transmission. In turn, if the transmitting node successfully receives the CTS message from the receiving node, the transmitting node would then proceed to transmit the data on the channel to the receiving node. And upon receipt of the data, the receiving node would then respond by transmitting an acknowledgement (ACK) message on the channel to the transmitting node.

In a system implementing such a handshake process, nodes may also be arranged to detect RTS and CTS messages on the channel and to avoid transmission on the channel for a period of time sufficient to allow the communication between transmitting and receiving nodes to complete (e.g., through ACK transmission). In practice, the avoidance time period may be referred to as a "network allocation vector" (NAV) period, and nodes may set their NAV period based on an expected duration of communication between the transmitting and receiving nodes. In particular, if a node detects an RTS message on the channel, then the node may set itself to avoid transmission on the channel for an RTS NAV that is sufficient to allow for transmission of the corresponding expected CTS message, data, and ACK message. Likewise, if a node detects a CTS message on the channel, then the node may set itself to avoid transmission on the channel for a CTS NAV that is sufficient to allow for transmission of the corresponding expected data and ACK message.

Overview

In practice, nodes may engage in various forms of data communications. In some cases, these data communications may involve voice communications, such as transmission of voice data as part of voice over Internet Protocol (VoIP) communications for instance. For example, as a user speaks into a transmitting node, the transmitting node may periodically transmit to a receiving node a quantity of data representing the user's voice, and the receiving node may thus receive, decode, and play out the voice to another user. In other cases, these data communications may involve non-voice communications. For example, non-voice communications may include transmission of any data other than voice data, such as transmission of image data and/or transmission of web data, among others.

According to various standards, a transmitting node may be configured (e.g., via manual engineering input) to spread transmission of such data communications over multiple available channels. For example, the transmitting node may apply the RTS/CTS process on each of various channels to determine that several channels are each available for carrying out transmissions. Once the transmitting node determines that several channels are each available for carrying out transmissions, the transmitting node may then spread transmission of data over these available channels. To do so, the transmitting node may simultaneously transmit different portions of the data respectively over different available channels for instance.

When the transmitting node operates according to such standards, however, the transmitting node may spread transmission of even a relatively small quantity of data over multiple available channels. For example, when the transmitting node engages in voice communications, the transmitting node may periodically transmit to a receiving node a relatively small quantity of voice data. And at each instance that the transmitting node transmits this relatively small quality of voice data, the transmitting node may spread transmission of this voice data over multiple available channels and may do so even though a single channel may provide a sufficient extent of resources to allow the transmitting node to transmit all of this voice data at once over just this single channel.

Moreover, when the transmitting node spreads transmission of this relatively small quantity of voice data over multiple channels in accordance with the above-mentioned standards, each such channel may end up having some extent of unused resources. But despite some extent of resources being unused on these channels, a neighboring node within range of the transmitting node may nonetheless not be able to transmit data over these multiple channels at times when the transmitting node spreads transmission of the relatively small quantity of voice data over these multiple channels. This may specifically occur because, when the transmitting node spreads transmission of this voice data over multiple channels in this manner, the neighboring node may determine (e.g., by listening to each channel for a certain time interval) that these multiple channels are each unavailable for carrying out transmissions and may then responsively avoid transmission on these channels for a period of time, such as the NAV period. This may thus lead to inefficient use of channel resources, among other undesirable outcomes.

Disclosed herein is an arrangement to help overcome problems that result from transmitting nodes operating in accordance with the above-mentioned processes. In accordance with the disclosure, a transmitting node may determine that data is to be communicated from the transmitting node to a receiving node and may then determine whether the data is to be communicated as part of a voice communication. If the transmitting node determines that the data is not to be communicated as part of a voice communication, then the transmitting node may responsively spread communication of the data over multiple available channels, such as in accordance with the above-mentioned standards. Whereas, if the transmitting node determines that the data is to be communicated as part of a voice communication, then the transmitting node may responsively communicate the data to the receiving node over just one channel rather than communicating the data to the receiving node over multiple channels. In this manner, the transmitting node can transmit a relatively small quantity of voice data over just a single channel while ensuring that a neighboring node can still transmit data over channels other than this single channel, thereby leading to more efficient use of channel resources.

Accordingly, disclosed herein is a method that involves a transmitting node determining that data is to be communicated from the transmitting node to a receiving node. The method also involves the transmitting node making a determination of whether the data is to be communicated as part of a voice communication. The method additionally involves, if the determination is that the data is to be communicated as part of a voice communication, then, responsive to making the determination, the transmitting node communicating the data to the receiving node over just one channel rather than communicating the data to the receiving node over two or more channels. Further, the method involves, if the determination is that the data is not to be communicated as part of a voice communication, then, responsive to making the determination, the transmitting node communicating the data to the receiving node over two or more channels rather than communicating the data to the receiving node over just one channel.

Additionally, disclosed herein is a method that involves a first wireless communication device (WCD) determining that data is to be transmitted from the first WCD to a second WCD. The method also involves the first WCD making a determination of whether the data to be transmitted comprises voice data. The method additionally involves, if the determination is that the data to be transmitted comprises voice data, then, responsive to making the determination, the first WCD transmitting the data to the second WCD over just one channel rather than transmitting the data to the second WCD over two or more channels. Further, the method involves, if the determination is that the data to be transmitted does not comprise voice data, then, responsive to making the determination, the first WCD transmitting the data to the second WCD over two or more channels rather than transmitting the data to the second WCD over just one channel.

Further, disclosed herein is a WCD including one or more processors, a non-transitory computer readable medium, and program instructions stored on the non-transitory computer readable medium and executable by the one or more processors to determine that data is to be communicated by the WCD. The program instructions are also executable to make a determination of whether the data is to be communicated as part of a voice communication. Further, the program instructions are executable by the one or more processors to transmit the data on one channel or on multiple channels based on the determination. In particular, if the determination is that the data is to be communicated as part of a voice communication, then, responsive to making the determination, the one or more processors would communicate the data over just one channel rather than communicate the data over two or more channels. Whereas, if the determination is that the data is not to be communicated as part of a voice communication, then, responsive to making the determination, the one or more processors would communicate the data over two or more channels rather than communicate the data over just one channel.

Yet further, in another respect, disclosed is a non-transitory computer-readable medium having stored thereon instructions executable (e.g., by one or more processors) to facilitate use of a single channel for voice communications and of multiple channels for non-voice communications.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example in the context of IEEE 802.11 (WiFi) communications. However, it should be understood that the principles described could be applied as well in numerous other contexts, not limited to the specifics described.

The 802.11 standards provide for centralized and peer-to-peer communication between WCDs such as computers, cell phones, appliances, access points, small cells, and other wirelessly-equipped devices, over shared wireless channels. Each such WCD will have a MAC address that uniquely identifies the WCD as compared with other WCDs, and communications between WCDs may include headers that carry source and destination MAC addresses, with the source MAC address being the MAC address of the WCD from which the communication is being sent and the destination MAC address being the MAC address of the WCD to which the communication is being sent.

In accordance with the 802.11 standards, a transmitting WCD that seeks to transmit data to a receiving WCD over a channel would first listen to the channel for a defined time interval known as a DIFS (Distributed coordination function (DCF) interframe space) duration. If the transmitting WCD does not hear any transmissions on the channel for the DIFS duration, then the transmitting WCD would deem the channel to be idle and would responsively commence communication with the receiving WCD on the channel, possibly making use of the basic RTS/CTS/data/ACK process described above.

To provide increased data throughput, recent versions of 802.11 including 802.11n and 802.11ac now also allow a pair of WCDs to communicate with each other on an aggregate of multiple 20 MHz channels at once. With such an arrangement, a transmitting WCD may evaluate multiple such channels to determine if they are idle in the manner described above, and the transmitting WCD may be configured (i) to commence communication with the receiving WCD concurrently on all of those channels, only if the transmitting WCD deems all of the channels to be idle, or (ii) to commence communication with the receiving WCD concurrently on just the contiguous channels that the WCD deems to be idle. Further, under 802.11n/ac, the transmitting WCD and receiving WCD would also engage in the RTS/CTS/data/ACK process respectively on each channel that the transmitting WCD selects for use.

Each WCD engaged in 802.11 communications will have an effective range of transmission, defined by the WCD's antenna structure, transmission power, and frequency of operation (with lower frequencies typically having less propagation loss and thus wider range). The range of transmission of one WCD could thus be the same as or different than the range of transmission of another WCD.

Figure 1:
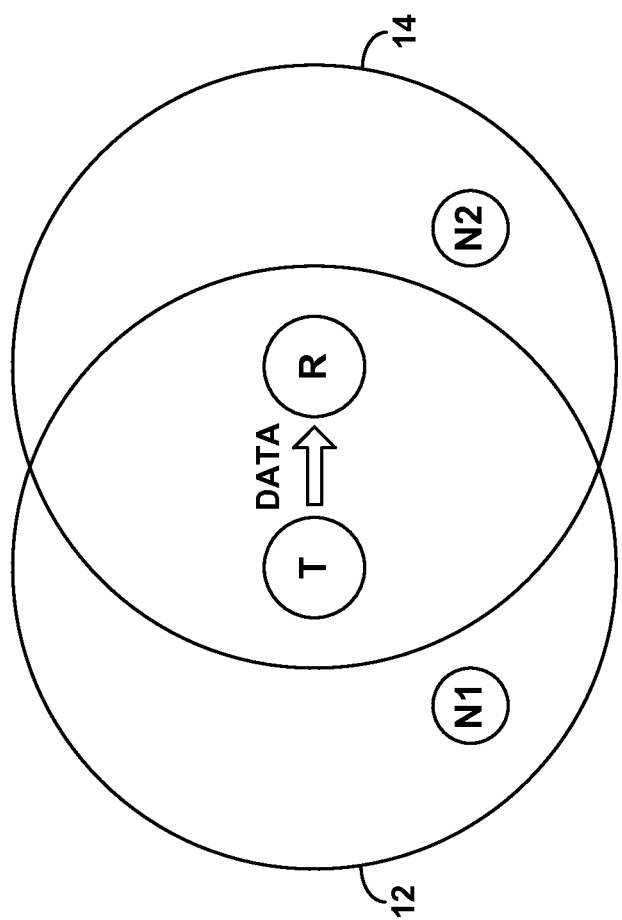
FIG. 1 is a depiction of a scenario in which a transmitting WCD seeks to transmit data to a receiving WCD.

FIG. 1 depicts an example arrangement in which a transmitting WCD, "T", seeks to transmit data (e.g., bearer data, initiated at an application layer or the like) to a receiving WCD, "R", on a representative 802.11 channel, and where neighboring WCDs, "N1" and "N2", are positioned in the vicinity. As shown in FIG. 1, the transmitting WCD has a respective range of transmission 12 and the receiving WCD has a respective range of transmission 14. The receiving WCD is shown within the transmitting WCD's range of transmission, so that the receiving WCD may receive transmissions from the transmitting WCD. Likewise, the transmitting WCD is shown within the receiving WCD's range of transmission, so that the transmitting WCD may receive transmissions from the receiving WCD. Further, the neighboring WCD N1 is shown within the transmitting WCD's range of transmission but outside the receiving WCD's range of transmission, so that the neighboring WCD N1 may receive transmissions from the transmitting WCD but may not receive transmissions from the receiving WCD. And the other neighboring WCD N2 is shown within the receiving WCD's range of transmission but outside the transmitting WCD's range of transmission, so that the neighboring WCD N2 may receive transmissions from the receiving WCD but may not receive transmissions from the transmitting WCD.

Figure 2:
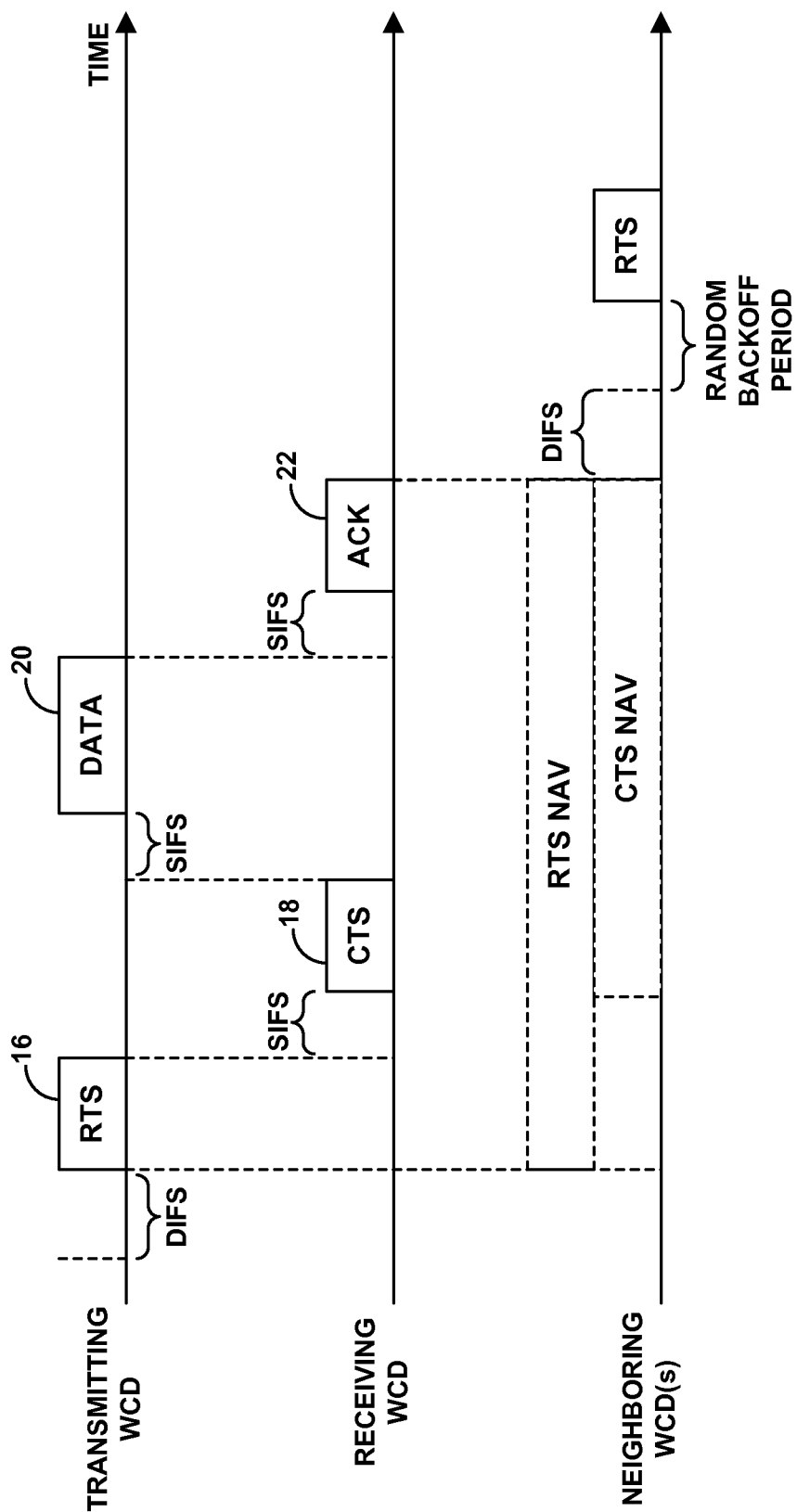
FIG. 2 is a depiction of an example RTS/CTS/data/ACK process.

FIG. 2 next depicts an example RTS/CTS/data/ACK process with this arrangement, on a representative 802.11 channel, although it should be understood that under 802.11n/ac or the like, the WCDs may engage in a similar process concurrently on multiple channels that the transmitting WCD deems to be idle.

As shown in FIG. 2, the transmitting WCD first monitors the channel for the DIFS duration to determine that the channel is idle. Upon thereby deeming the channel to be idle, the transmitting WCD then transmits to the receiving WCD an RTS message 16 as an indication that the transmitting WCD has data to transmit to the receiving WCD. The RTS message may carry source and destination MAC addresses and a value (e.g., a control message sub-type value) indicating that the message is an RTS message, among possibly other information such as a transmission timestamp for instance. Further, a predefined segment of time may be provided for this RTS message transmission.

Assuming the receiving WCD successfully receives the RTS message from the transmitting WCD, the receiving WCD would thus become aware that the transmitting WCD has data to send to the receiving WCD. As further shown, the receiving WCD then responsively waits a predefined time interval known as an SIFS (short interframe space) duration, shorter than the DIFS duration, and then transmits on the channel a CTS message 18 as an indication of readiness to receive and thus that the transmitting WCD is clear to send. The CTS message may carry a destination MAC address (of the transmitting WCD) and a value (e.g., another control message sub-type value) indicating that the message is a CTS message, among possibly other information such as a transmission timestamp for instance. Further, a predefined segment of time may be provided for this CTS message transmission.

Assuming the transmitting WCD successfully receives the CTS message from the receiving WCD, the transmitting WCD would thus become aware that the transmitting WCD is clear to transmit to the receiving WCD. The transmitting WCD would then responsively wait another SIFS duration and would then transmit the data 20 to the receiving WCD. The data transmission may carry source and destination MAC addresses and a value indicating that the transmission is a data transmission and may then of course carry the data (e.g., bearer data), among possibly other information. A representative implementation assumes that the data transmission is of a predefined duration or extent, which may accommodate just a portion of data buffered by the transmitting WCD for transmission to the receiving WCD. Alternatively, implementations could provide for adaptive data transmission size, possibly having the RTS message specify the data duration and the CTS message confirm the data duration.

Assuming the receiving WCD successfully receives the data transmission from the transmitting WCD, the receiving WCD would then wait another SIFS duration and then respond to the successful receipt of the data transmission by transmitting to the transmitting WCD an ACK message 22 to acknowledge receipt of the data. Similar to the CTS transmission discussed above, the ACK message may carry a destination MAC addresses and a value (e.g., another control message sub-type value) indicating that the message is an ACK message, among possibly other information such as a transmission timestamp for instance. Further, a predefined segment of time may be provided for this ACK message transmission.

As noted above, a neighboring WCD may be arranged to detect transmissions on the channel and responsively forgo use of (transmission on) the channel for a NAV period sufficient to allow for completion of the associated communication. A neighboring WCD may do this when the neighboring WCD itself seeks to transmit data on the channel and thus monitors the channel for a DIFS duration as noted above. If the neighboring WCD thereby detects that the channel is not idle, then the neighboring WCD may set an appropriate NAV timer and then avoid use of the channel for the duration of that NAV timer. Upon expiration of the NAV timer, the neighboring WCD may then monitor the channel for a new DIFS duration, possibly plus a random backoff period, and if the channel is idle may then send its own RTS message.

By way of example, if neighboring WCD N1 detects the RTS message transmission from the transmitting WCD to the receiving WCD (noting from content of the transmission that the transmission is an RTS message transmission), then neighboring WCD N1 may responsively set and apply an RTS NAV timer for a duration spanning the RTS message, the first SIFS, the CTS message, the second SIFS, the data transmission, the third SIFS, and the ACK. Thus, neighboring WCD N1 would configure itself to forgo use of the channel for that full RTS NAV period, to allow the remainder of the communication exchange between the transmitting WCD and the receiving WCD to be fully carried out.

As another example, if neighboring WCD N2 detects the CTS message transmission from the receiving WCD (noting from content of the transmission that the transmission is a CTS message transmission), then neighboring WCD N2 may responsively set and apply a CTS NAV timer for a duration spanning the CTS message, the second SIFS, the data transmission, the third SIFS, and the ACK. Thus, neighboring WCD N2 would configure itself to forgo use of the channel for that full CTS NAV period, to allow the remainder of the communication exchange between the transmitting WCD and the receiving WCD to be fully carried out. Other examples are also possible.

In practice, a WCD may take various forms. In some cases, a WCD may be an end-user WCD, such as a computer, a cell phone, an appliance, or the like. In these cases, the end-user WCD may directly communicate with other end-user WCDs or may indirectly communicate with other end-user WCDs, such as via an access point WCD that provides connectivity to a wireless communication system for instance. In other cases, a WCD may itself be an access point WCD (e.g., a macro base station, a small cell, or the like) acting as an intermediary entity that radiates to define a coverage area for providing end-user WCDs within coverage of the access point WCD with connectivity to a wireless communication system, so as to help facilitate communications between end-user WCDs for instance.

Figure 3:
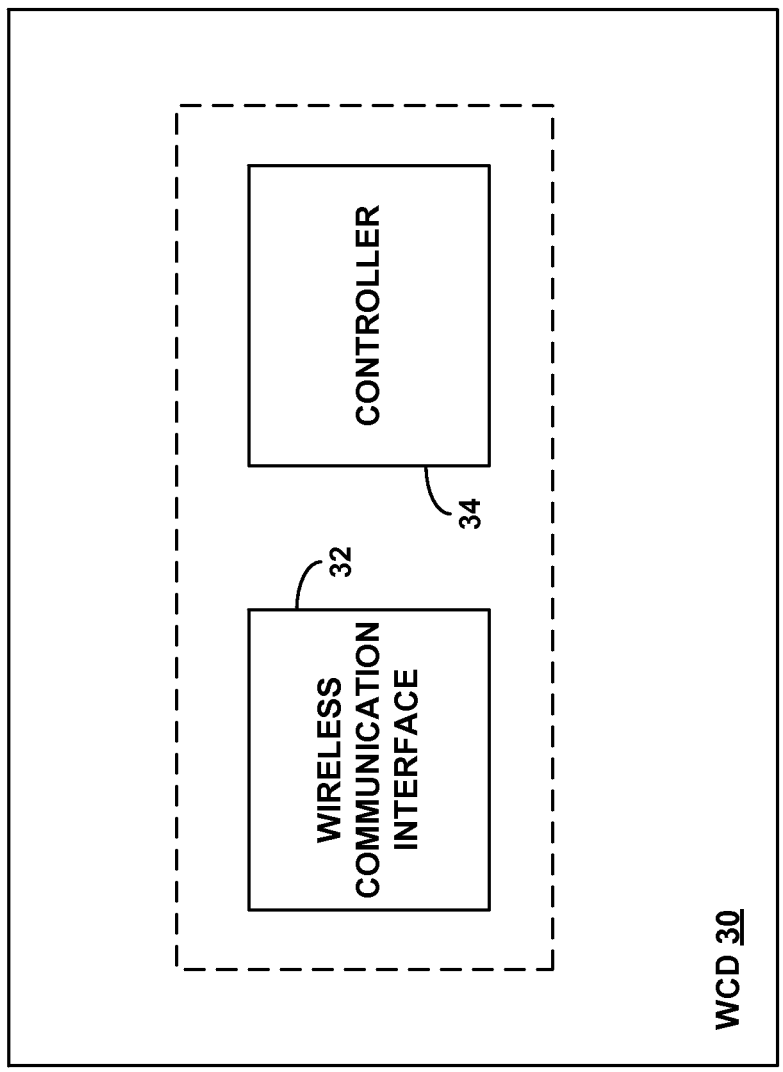
FIG. 3 is a simplified block diagram of an example WCD operable in accordance with the disclosure.

FIG. 3 is next a simplified block diagram of an example WCD 30, showing some of the components that can be included in such a device to facilitate carrying out features such as those discussed herein. This WCD could be configured to engage in 802.11 communications in line with the discussion above, and may thus at times function as a transmitting WCD, at other times function as a receiving WCD, and at other times function as a neighboring WCD.

As shown in FIG. 3, the example WCD 30 includes a wireless communication interface 32 and a controller 34, which may be integrated together (e.g., on a common chipset) or otherwise communicatively linked together by a system bus or other connection mechanism. In practice, the wireless communication interface 32 may comprise an 802.11 (or other) radio and antenna structure, configured to transmit and receive on one or more designated channels, such as 20 MHz 802.11 wireless channels for instance, and thus to detect communications on such a channel, such as communications indicating by their MAC addresses that they are from one particular device to another and indicating by other contained information what type of communications they are. The controller 34 may take various forms (such as one or more processing units (e.g., microprocessors), non-transitory data storage, and program instructions executable by the processing unit(s), thus establishing a programmed processing unit), configured to carry out (e.g., to cause the WCD to carry out) various operations such as those discussed herein.

Further, if the example WCD 30 takes the form of an end-user WCD, then the example WCD 30 may also include a user interface (not shown) that provides a user with an ability to interact with the WCD 30. For example, a user interface may be a graphical user interface (GUI) providing capabilities for initiating a voice call to another WCD (e.g., dialing a phone number) and/or for accepting a voice call initiated by another WCD. In another example, a user interface may also take the form of an audio input interface (e.g., a microphone), such as for receiving voice input (e.g., from a user) during a voice call for instance. And in yet another example, a user interface may also take the form of an audio output interface (e.g., a speaker), such as for playing out another user's voice during a voice call for instance.

Whereas, if the example WCD 30 takes the form of an access point WCD, then the example WCD 30 may also have a wired or wireless connection (not shown) to supporting network infrastructure. This supporting network infrastructure may help enable the access point WCD to serve end-user WCDs within coverage of the access point WCD. For example, the access point WCD may take the form of a receiving WCD when it receives from a transmitting end-user WCD data that is destined for a remote party. And once the access point WCD receives this data, the access point WCD may then transmit this data to the supporting network infrastructure for eventual transmission (e.g., via a packet-switch network) to the remote party. Alternatively, the supporting network infrastructure may receive (e.g., via the packet-switch network) data that was originally transmitted by a remote party and is destined for a receiving end-user WCD. In this case, the access point WCD may receive this data from the supporting network infrastructure and may then take the form of a transmitting WCD when it directly transmits this data to the receiving end-user WCD. Other cases are possible as well.

When WCDs communicate with each other, these communications may include communications of various types of data. For example, this data may be voice data, such as voice data to be transmitted as part of a voice call between WCDs. In practice, set up of a voice call may take various forms. In one case, end-user WCDs may directly engage in call set up signaling with each other to establish a voice call with each other. And in another case, an end-user WCD may engage in call set up signaling (e.g., Session Initiation Protocol (SIP) signaling) with an access point WCD to establish a voice call with a remote entity. Through this call set up signaling, the end-user WCD may thus place a voice call to the remote party or may receive a voice call from the remote party. Other cases are possible as well.

Once a voice call has been established, a transmitting WCD and a receiving WCD may then exchange voice data. In one case, this exchange of voice data may involve direct exchange of voice data between end-user WCDs. And in another case, this exchange of voice data may involve an access point WCD transmitting voice data to an end-user WCD or vice versa. In either case, the transmitting WCD and the receiving WCD may exchange voice data in various ways. For example, the transmitting WCD and the receiving WCD may exchange voice data as part of a digitized voice communication, such as a VoIP communication. In particular, as a user speaks into the transmitting WCD, the transmitting WCD may receive voice input and may then digitize this voice input to produce a digital bit stream representative of the voice input. This digital bit stream may then be encoded at a rate of a certain number of bytes per periodic interval, such as every 20 milliseconds, with the number of bytes per period depending on the codec. Moreover, as part of the VoIP communication, the transmitting WCD may also use various compression techniques to reduce the size of the data to be transmitted and may also add one or more headers to the data to be transmitted, such as a header including the transmitting WCD's IP address and the receiving WCD's IP address, among others. Given this arrangement, as the user speaks into the transmitting WCD, the transmitting WCD may thus periodically transmit to the receiving WCD a resulting quantity of data representing the user's voice, and the receiving WCD (e.g., an end-user WCD) may thus receive, decode, and play out the voice to another user.

In other examples, when WCDs communicate with each other, these communications may include communications of data other than voice data, such as data transmitted from a transmitting WCD to a receiving WCD as part of a non-voice communication. This non-voice communication may be an e-mail communication, a file transfer, a text message, or any other form of communication that includes data other than just data communicated as part of a voice call for instance. Other examples are possible as well.

As noted, the present disclosure provides for a process that is used to facilitate use of a single channel for voice communications and of multiple channels for non-voice communications. This process could be carried out by an end-user WCD or by an access point WCD, among other possibilities. For simplicity, however, the process will generally be described here in a scenario where a transmitting WCD transmits data to a receiving WCD and also carries out all aspects of the process.

In accordance with this process, a transmitting WCD may determine that data is to be transmitted from the transmitting WCD to a receiving WCD and may do so in various ways. For example, if the transmitting WCD is an end-user WCD, then the transmitting WCD engaging in call set up signaling (e.g., to establish a voice call with the receiving WCD) may serve as an indication to the transmitting WCD that data is to be transmitted to the receiving WCD once the voice call has been established. While in the event of a non-voice communication, the transmitting end-user WCD may determine in other ways that data is to be transmitted. For instance, a user may provide text input on the transmitting WCD (e.g., via a messaging application) to transmit a text message to a particular receiving WCD. And when the user provides text input in manner, this may serve as an indication to the transmitting WCD that the transmitting WCD will communicate this text message to the particular receiving WCD.

In yet other examples, if the transmitting WCD is an access point WCD, then the transmitting WCD may use other approaches to determine that data is to be transmitted. For instance, the transmitting access point WCD may receive from the supporting network infrastructure data that was originally transmitted by a remote party and is destined for a receiving end-user WCD. And when the access point WCD receives the data in this manner, this may serve as an indication to the transmitting access point WCD that data is to be transmitted. Other examples are also possible.

Further, the transmitting WCD may make a determination of whether the data to be transmitted is voice data or whether the data to be transmitted is data other than voice data. The transmitting WCD may make this determination in various ways. For example, the transmitting WCD may be set to transmit data to the receiving WCD in the form of one or more data packets, each having a respective payload segment carrying some or all of the data at issue and perhaps also having a header. In some cases, the data carried in the payload segment of such packets may be a digitally encoded representation of particular content being communicated. With this arrangement, the transmitting WCD may use various techniques (e.g., deep packet inspection (DPI)) to read one or more such packets to determine a type of content being carried by such packet(s). For instance, the type of content may be voice content or may be content other than voice content (e.g., web content, gaming content, or the like).

In another example, a differentiated services code point (DSCP) may appear in a data packet's header (e.g., in an IP header, the DSCP may be placed in an IP type of service (TOS) field.) This DSCP may contain at least one value (e.g., a precedence value) corresponding to a type of traffic being forwarded/transmitted, which may take the form of a representative binary sequence for instance. As a specific example, one such value (e.g., a precedence value of 5) may correspond to voice real-time transport protocol (RTP) traffic and another such value (e.g., a precedence value of 3) may correspond to voice signaling traffic. Whereas, yet another such value (e.g., a precedence value of 7) may correspond to network signaling traffic. Accordingly, a WCD may examine a data packet's DSCP to identify the type of traffic represented by this packet. In particular, the WCD could read the header of such a data packet and could programmatically evaluate the data in the header to determine the type of traffic. For example, if the IP TOS field carries a value corresponding to voice RTP traffic, then the WCD may responsively determine that the type of traffic represented by the data packet is voice RTP traffic.

In yet another example, a WCD may evaluate the type of application or interface that is being engaged as part of a communication. For instance, the WCD may determine that the above-mentioned GUI is being engaged, such as for initiating a voice call to another WCD or for accepting a voice call initiated by another WCD. In this instance, the GUI being engaged in this manner may serve as an indication to the WCD that the WCD is engaging or is about to engage in a voice communication that involves transmission of voice data. In another instance, the WCD may determine that the above-mentioned messaging application is being engaged, such as when a user provides text input on the WCD to transmit a text message to a particular receiving WCD. In this instance, the messaging application being engaged in this manner may serve as an indication to the WCD that the WCD is engaging or is about to engage in a non-voice communication, such as a text communication for example.

In yet another example, a WCD may leverage a version of 802.11 known as 802.11e in order to determine whether the data to be transmitted is voice data or whether the data to be transmitted is data other than voice data. In particular, 802.11e may establish access categories (AC), which essentially define types of traffic (e.g., voice traffic) categories represented by certain data packets. The 802.11e version thus allows for marking a data packet according to 802.11e AC. And a WCD may implement 802.11e AC to determine the type of traffic. For instance, the WCD may refer to mapping data that maps an incoming data packet to the relative type of traffic category defined by the AC. Of course, other examples are possible as well.

In some instances, the transmitting WCD may make a determination that the data to be transmitted is data other than voice data. For example, the transmitting WCD may determine that the type of traffic that will be communicated from the transmitting WCD to the receiving WCD is traffic other than voice RTP traffic or voice signaling traffic, such as network signaling traffic, or the like. In accordance with the process disclosed herein, when the transmitting WCD makes a determination that the data to be transmitted is not voice data, the transmitting WCD may responsively transmit the data to the receiving WCD over multiple channels at once (i.e., rather than over just one channel at once), such as according to the 802.11n standard and/or the 802.11ac standard discussed above for example.

More specifically, if the transmitting WCD makes a determination that the data to be transmitted is not voice data, then the transmitting WCD may responsively select from among a plurality of channels two or more channels over which to transmit the data to the receiving WCD. For example, the transmitting WCD may select two or more contiguous channels that the transmitting WCD deems to be idle or the transmitting WCD may select two or more non-contiguous channels that the transmitting WCD deems to be idle. In either case, once the transmitting WCD selects the channels, the transmitting WCD may then transmit the data to the receiving WCD over the two or more selected channels.

In other instances, the transmitting WCD may make a determination that the data to be transmitted is voice data. For example, the transmitting WCD may determine that the type of traffic that will be communicated from the transmitting WCD to the receiving WCD is voice RTP traffic or voice signaling traffic, or the like. In accordance with the process, when the transmitting WCD makes a determination that the data to be transmitted is voice data, the transmitting WCD may responsively transmit the data to the receiving WCD over just one channel rather than transmitting the data to the receiving WCD over multiple channels. In this way, since various standards may cause the transmitting WCD to periodically transmit relatively small quantities of voice data, the transmitting WCD can transmit at each instance a relatively small quantity of voice data at once over just a single channel (i.e., rather than spreading transmission of this voice data over multiple channels at once), thereby ensuring that channels other than this single channel remain idle and that thus a neighboring WCD can transmit data over these other channels.

More specifically, if the transmitting WCD makes a determination that the data to be transmitted is voice data, then the transmitting WCD may responsively select from among the plurality of channels just one channel over which to transmit the data to the receiving WCD rather than selecting two or more channel over which to transmit the data to the receiving WCD. Once the transmitting WCD selects the channel, the transmitting WCD may then transmit the data to the receiving WCD over the one selected channel.

In some implementations, when selecting the one channel over which to transmit the data to the receiving WCD, the transmitting WCD may simply select the first channel that the transmitting WCD determines is available for carrying out transmission. For example, the transmitting WCD may monitor a particular channel (e.g., for a DIFS duration) and may detect that the particular channel is idle. Once the transmitting WCD detects that the particular channel is idle, the transmitting may then select this particular channel as the one channel over which to transmit the data to the receiving WCD. Moreover, the transmitting WCD may make this selection without even determining whether other channels from among the plurality of channels are also each idle. With this approach, the transmitting WCD can thus select the channel in a less time consuming manner. Other examples are also possible.

In a further aspect, when the transmitting WCD selects just one channel over which to transmit the data to the receiving WCD, the transmitting WCD may engage in the RTS/CTS/data/ACK process on just the one channel that the transmitting WCD selects for use. For example, before transmitting the data, the transmitting WCD may transmit over the selected channel an RTS message to the receiving WCD. Once the receiving WCD receives this RTS message, the receiving WCD would thus become aware that the transmitting WCD has data to send to the receiving WCD over the selected channel. The receiving WCD may then responsively transmit on the selected channel a CTS message as an indication that the receiving WCD is ready to receive and thus that the transmitting WCD is clear to send. Once the transmitting WCD receives the CTS message, the transmitting WCD may then transmit the data to the receiving WCD over the selected channel.

Assuming the receiving WCD successfully receives the data transmission from the transmitting WCD over the selected channel, the receiving WCD would then respond to the successful receipt of the data transmission by transmitting to the transmitting WCD over the selected channel an ACK message to acknowledge receipt of the data. Of course, when the transmitting WCD engages in this RTS/CTS/data/ACK process on the selected channel, the transmitting WCD may do so while applying the above-mentioned waiting durations (e.g., SIFS durations) and/or transmission durations (e.g., the predefined segment of time provided for CTS message transmission).

With this arrangement, a neighboring WCD may forgo use of the selected channel while the transmitting WCD engages in this RTS/CTS/data/ACK process on the selected channel. For example, if the neighboring WCD detects the RTS message transmission (or alternatively the CTS message transmission) over the selected channel, then neighboring WCD may responsively apply an RTS NAV timer (or CTS NAV timer when detecting a CTS message transmission). Thus, the neighboring would configure itself to forgo use of the selected channel for that full RTS NAV period (or a CTS NAV period when detecting a CTS message transmission), to allow the remainder of the communication exchange between the transmitting WCD and the receiving WCD to be fully carried out.

In yet a further aspect, the disclosed process may increase channel utilization. In particular, the above-mentioned CSMA/CA protocol may divide a channel into airtime slots, which define certain transmission durations (e.g., each being nine microseconds (9 µS)) over time. Some of these airtime slots (e.g., two airtime slots) may be assigned to handle the above-mentioned random backoff period and may then be followed by one or more airtime slots each used for transmission of data, for instance. According to various standards, a transmitting WCD may transmit voice data in a given airtime slot while also spreading transmission of the voice data over multiple available channels.

When operating according to such standards, however, the transmitting WCD may only partially utilize the airtime slot, specifically due to transmission of data being spread over these multiple available channels. For instance, the transmitting WCD may transmit the voice data over multiple channels for a duration of two microseconds (2 µS), and the remaining duration of the airtime slot (e.g., the remaining seven microseconds (7 µS)) for each channel may then remain unused. And while the transmitting WCD may only partially utilize the airtime slot, other WCDs may not be able to carry out transmissions over these channels during the airtime slot at issue. Yet, when carrying out the process disclosed herein, the transmitting WCD may impose transmission of the voice data over only a single channel during the airtime slot at issue. This process may increase utilization of the airtime slot, thereby resulting in more efficient use of channel resources. For instance, the transmitting WCD may transmit the voice data over the single channel for the entire duration of the airtime slot (e.g., 9 µS). Moreover, when carrying out this process, other WCDs could still transmit during this airtime slot data over channels other than the single channel at issue. Other aspects are also possible.

Figure 4:
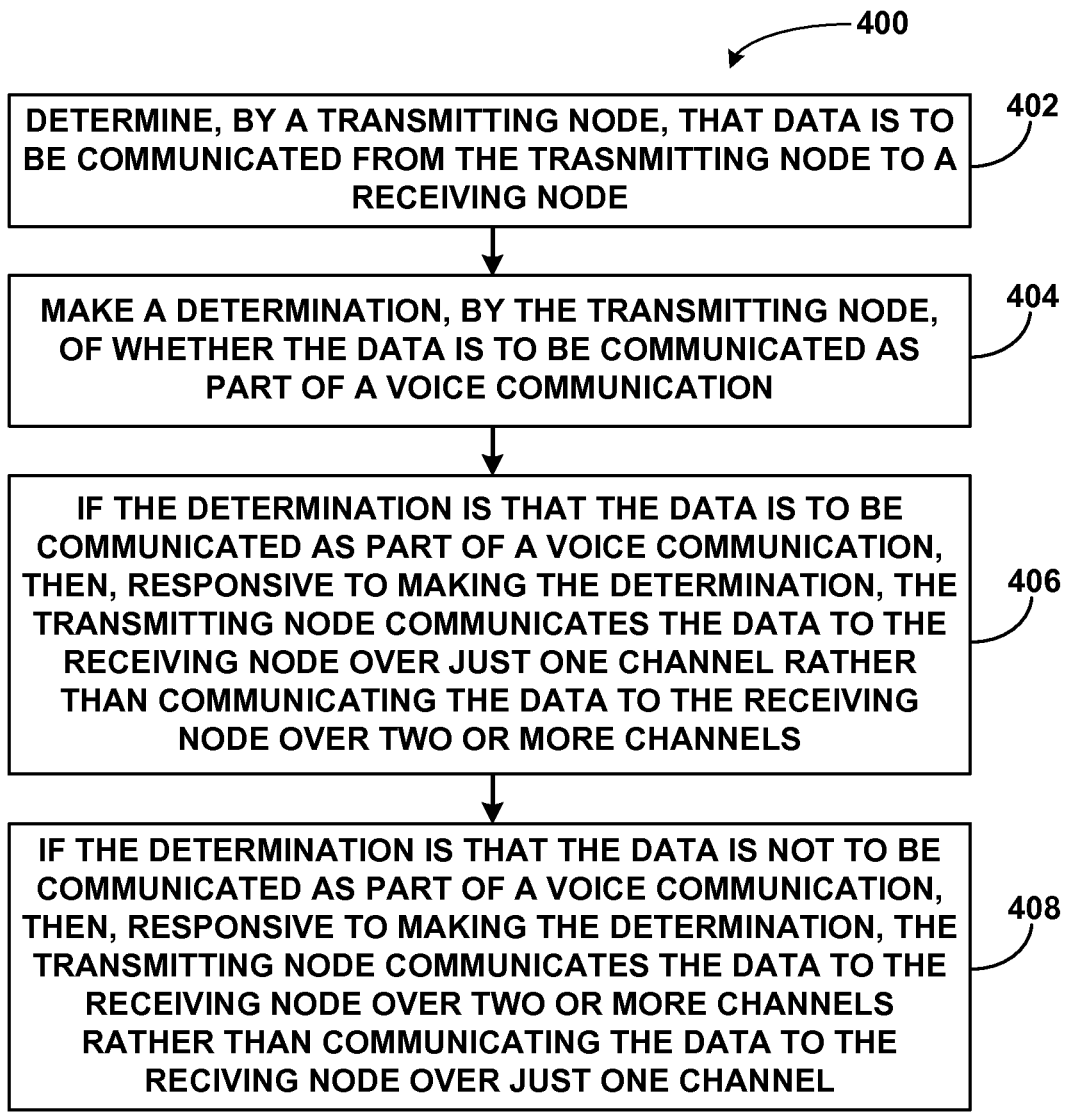
FIG. 4 is a flowchart illustrating a method to facilitate use of a single channel for voice communications and of multiple channels for non-voice communications, in accordance with an example embodiment.

FIG. 4 is a flowchart illustrating a method 400, according to an example embodiment. Illustrative methods, such as method 400, may be carried out in whole or in part by component(s) and/or arrangement(s) in a wireless communication device (WCD), such as by the one or more of the components of the example WCD 30 shown in FIG. 3. However, it should be understood that example methods, such as method 400, may be carried out by other entities or combinations of entities as well as in other arrangements, without departing from the scope of the disclosure.

Accordingly, as shown by block 402 in FIG. 4, method 400 involves a transmitting node determining that data is to be communicated from the transmitting node to a receiving node. At block 404, method 400 then involves the transmitting node making a determination of whether the data is to be communicated as part of a voice communication. At block 406, method 300 then involves, if the determination is that the data is to be communicated as part of a voice communication, then, responsive to making the determination, the transmitting node communicating the data to the receiving node over just one channel rather than communicating the data to the receiving node over two or more channels. And at block 408, method 400 then involves, if the determination is that the data is not to be communicated as part of a voice communication, then, responsive to making the determination, the transmitting node communicating the data to the receiving node over two or more channels rather than communicating the data to the receiving node over just one channel.

Figure 5:
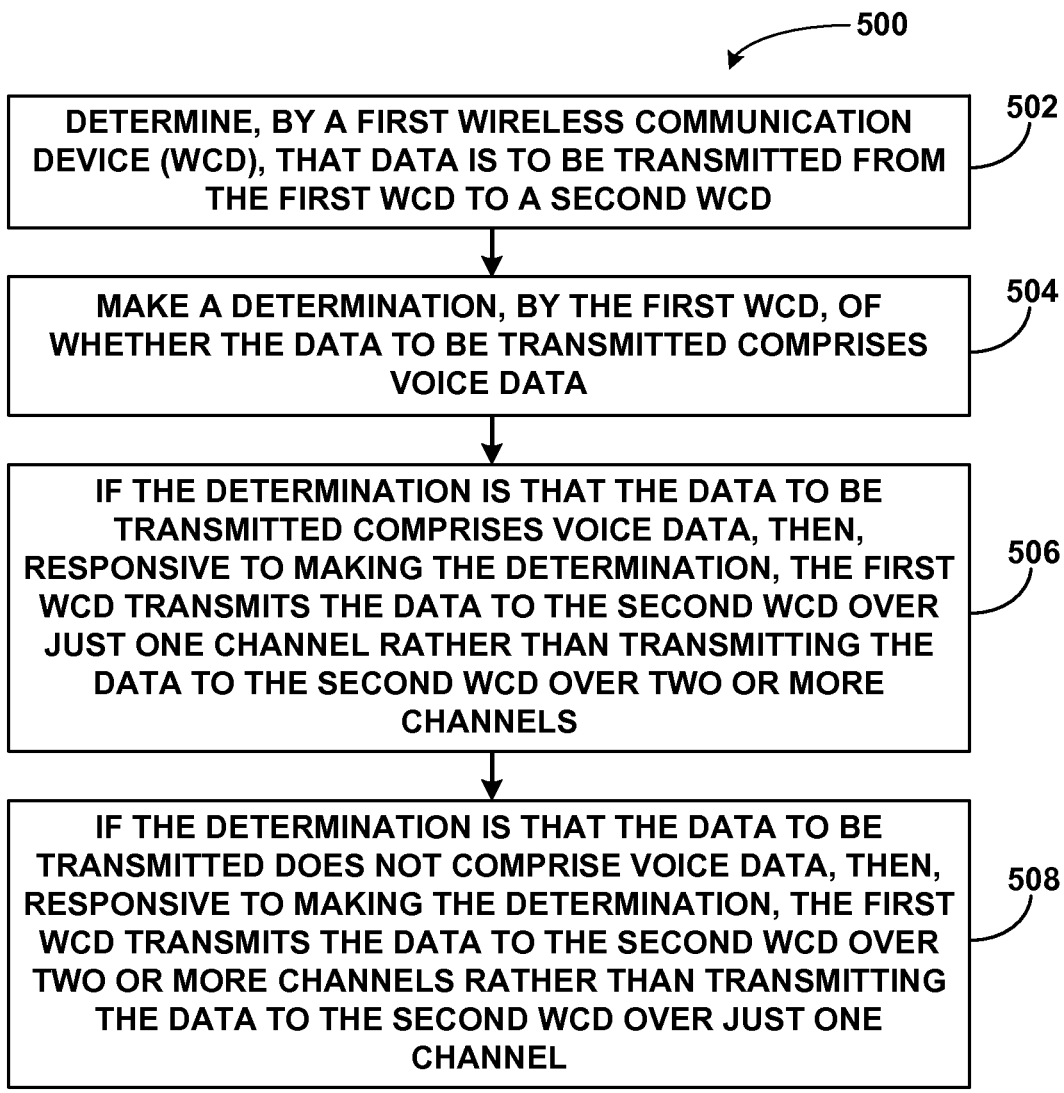
FIG. 5 is a flowchart illustrating another method to facilitate use of a single channel for voice communications and of multiple channels for non-voice communications, in accordance with an example embodiment.

FIG. 5 is then a flowchart illustrating another method 500, according to an example embodiment. As shown by block 502 in FIG. 5, method 400 involves a first WCD determining that data is to be transmitted from the first WCD to a second WCD. At block 404, method 400 then involves the first WCD making a determination of whether the data to be transmitted comprises voice data. At block 506, method 500 then involves, if the determination is that the data to be transmitted comprises voice data, then, responsive to making the determination, the first WCD transmitting the data to the second WCD over just one channel rather than transmitting the data to the second WCD over two or more channels. And at block 508, method 500 then involves, if the determination is that the data to be transmitted does not comprise voice data, then, responsive to making the determination, the first WCD transmitting the data to the second WCD over two or more channels rather than transmitting the data to the second WCD over just one channel.

Figure 6:
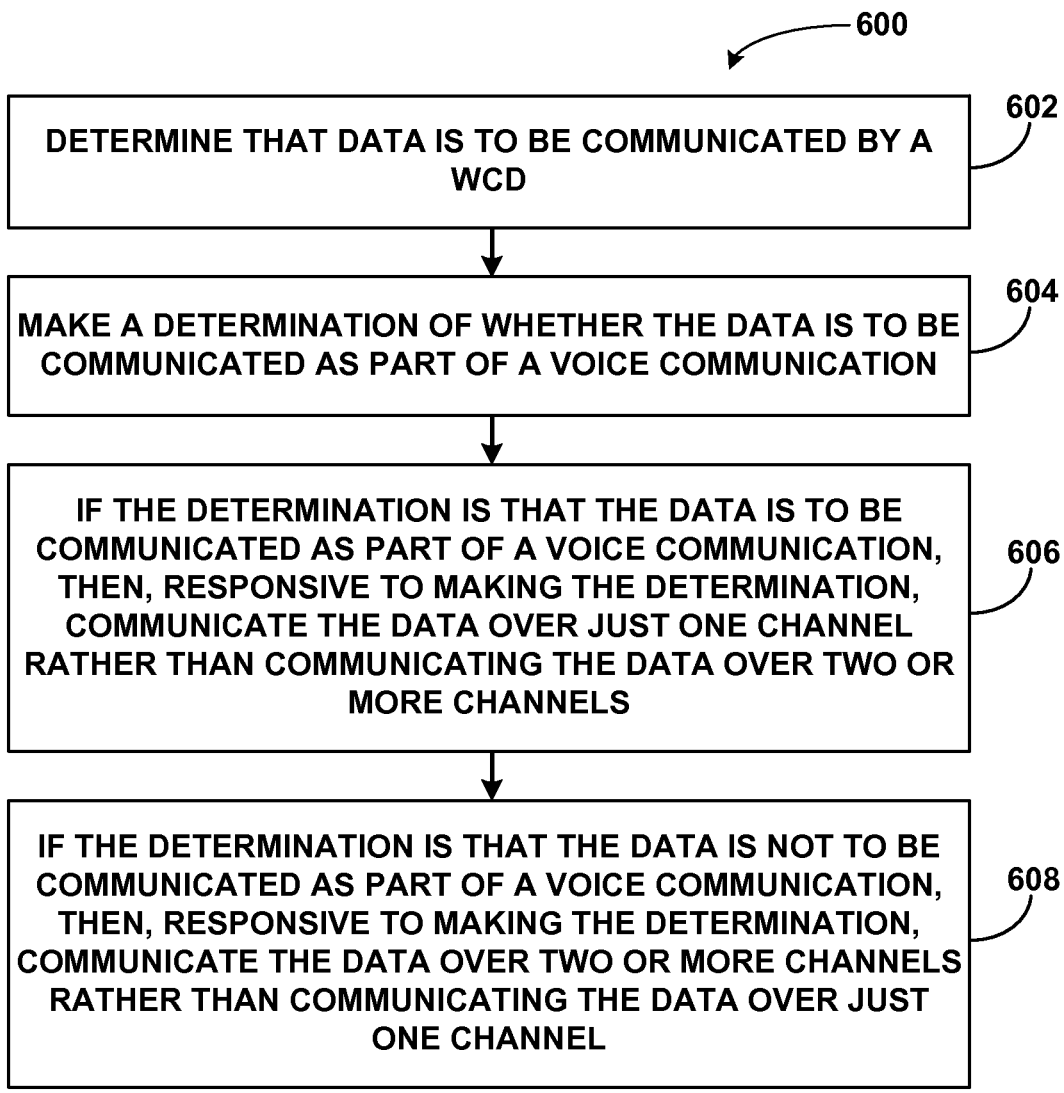
FIG. 6 is a flowchart illustrating yet another method to facilitate use of a single channel for voice communications and of multiple channels for non-voice communications, in accordance with an example embodiment.

FIG. 6 is next a flow chart 600 depicting yet another example set of operations that can be carried out in an implementation of this process. As shown in FIG. 6, at block 602, the operations involve determining that data is to be communicated by the WCD. Also, at block 604, the operations involve making a determination of whether the data is to be communicated as part of a voice communication. Additionally, at block 606, the operations involve, if the determination is that the data is to be communicated as part of a voice communication, then, responsive to making the determination, communicate the data over just one channel rather than communicate the data over two or more channels. Further, at block 608, the operations involve, if the determination is that the data is not to be communicated as part of a voice communication, then, responsive to making the determination, communicate the data over two or more channels rather than communicate the data over just one channel.

Exemplary embodiments have been described above. Those skilled in the art will understand, however, that changes and modifications may be made to these embodiments without departing from the true scope and spirit of the invention.

We claim:

1. A method comprising:
   determining, by a first wireless communication device (WCD), that data is to be transmitted from the first WCD to a second WCD, wherein the data to be transmitted comprises one or more data packets;
   making a determination, by the first WCD, of whether at least a particular data packet of the data to be transmitted comprises voice content; and
   controlling, by the first WCD, whether to transmit the particular data packet to the second WCD over just one channel or rather over multiple channels, wherein the controlling is based on the determination of whether the particular data packet comprises voice content, wherein (i) if the determination is that the particular data packet comprises voice content, then, responsive to making the determination, the first WCD transmits the particular data packet to the second WCD over just one channel rather than transmitting the particular data packet to the second WCD over two or more channels, and (ii) if the determination is that the particular data packet does not comprise voice content, then, responsive to making the determination, the first WCD transmits the particular data packet to the second WCD over two or more channels rather than transmitting the particular data packet to the second WCD over just one channel.

2. The method of claim 1, further comprising:
   if the determination is that the particular data packet does not comprise voice content, then, responsive to making the determination, the first WCD selecting, from among a plurality of channels that are available for the first WCD to transmit the particular data packet, two or more channels over which to transmit the particular data packet to the second WCD rather than selecting from among the plurality of channels just one channel over which to transmit the particular data packet to the second WCD,
   wherein transmitting the particular data packet to the second WCD over two or more channels comprises transmitting the particular data packet to the second WCD over the two or more selected channels.

3. The method of claim 1, further comprising:
if the determination is that the particular data packet comprises voice content, then, responsive to making the determination, the first WCD selecting, from among a plurality of channels that are available for the first WCD to transmit the particular data packet, just one channel over which to transmit the particular data packet to the second WCD rather than selecting from among the plurality of channels two or more channels over which to transmit the particular data packet to the second WCD,
wherein transmitting the particular data packet to the second WCD over just one channel comprises transmitting the particular data packet to the second WCD over just the one selected channel.

4. The method of claim 3, wherein selecting from among the plurality of channels just one channel over which to transmit the particular data packet to the second WCD comprises:
determining that a particular channel from among the plurality of channels is available for carrying transmissions; and
in response to determining that the particular channel of the plurality of channels is available for carrying transmissions and without also determining whether other channels from among the plurality of channels are also each available for carrying transmissions, selecting the particular channel as the one channel over which to transmit the particular data packet to the second WCD.

5. The method of claim 3,
wherein, before the first WCD transmits the particular data packet to the second WCD over just the one selected channel, the first WCD and the second WCD engage over just the one selected channel in a handshake process to prepare for transmission of the particular data packet from the first WCD to the second WCD over just the one selected channel, and
wherein the handshake process comprises the first WCD transmitting to the second WCD over just the one selected channel a ready-to-send (RTS) message for the transmission of the particular data packet and, in response to the RTS message, the second WCD transmitting to the first WCD over just the one selected channel a clear-to-send (CTS) message for the transmission of the particular data packet.

6. The method of claim 3, further comprising:
if the determination is that the particular data packet comprises voice content, then, after the first WCD transmits the particular data packet to the second WCD over just one channel, the first WCD receives from the second WCD over just the one selected channel an acknowledgement, wherein the acknowledgement indicates that the second WCD received from the first WCD the particular data packet.

7. A method comprising:
determining, by a transmitting node, that data is to be communicated from the transmitting node to a receiving node, wherein the data to be communicated comprises one or more data packets;
making a determination, by the transmitting node, of whether at least a particular data packet of the data comprises voice content to be communicated as part of a voice communication; and
controlling, by the transmitting node, whether to communicate the particular data packet to the receiving node over just one channel or rather over multiple channels, wherein the controlling is based on the determination of whether the particular data packet comprises voice content to be communicated as part of a voice communication, wherein (i) if the determination is that the particular data packet comprises voice content to be communicated as part of a voice communication, then, responsive to making the determination, the transmitting node communicates the particular data packet to the receiving node over just one channel rather than communicating the particular data packet to the receiving node over two or more channels, and (ii) if the determination is that the particular data packet does not comprise voice content to be communicated as part of a voice communication, then, responsive to making the determination, the transmitting node communicates the particular data packet to the receiving node over two or more channels rather than communicating the particular data packet to the receiving node over just one channel.

8. The method of claim 7, wherein the transmitting node comprises an end-user wireless communication device (WCD), and wherein the receiving node comprises an access point WCD.

9. The method of claim 7, wherein the transmitting node comprises an access point wireless communication device (WCD), and wherein the receiving node comprises an end-user WCD.

10. The method of claim 7, wherein the voice communication comprises a Voice over Internet Protocol (VoIP) communication.

11. The method of claim 7, further comprising:
if the determination is that the particular data packet does not comprise voice content to be communicated as part of a voice communication, then, responsive to making the determination, the transmitting node selecting from among a plurality of channels that are available for the transmitting node to transmit the particular data packet two or more channels over which to communicate the particular data packet to the receiving node rather than selecting from among the plurality of channels just one channel over which to communicate the particular data packet to the receiving node,
wherein communicating the particular data packet to the receiving node over two or more channels comprises communicating the particular data packet to the receiving node over the two or more selected channels.

12. The method of claim 7, further comprising:
if the determination is that the particular data packet comprises voice content to be communicated as part of a voice communication, then, responsive to making the determination, the transmitting node selecting from among a plurality of channels that are available for the transmitting node to transmit the particular data packet just one channel over which to communicate the particular data packet to the receiving node rather than selecting from among the plurality of channels two or more channels over which to communicate the particular data packet to the second WCD,
wherein communicating the particular data packet to the receiving node over just one channel comprises communicating the particular data packet to the receiving node over just the one selected channel.

13. The method of claim 12, wherein selecting from among the plurality of channels just one channel over which to communicate the particular data packet to the receiving node comprises:

determining that a particular channel from among the plurality of channels is available for carrying communications; and in response to determining that the particular channel of the plurality of channels is available for carrying communications and without also determining whether other channels from among the plurality of channels are also each available for carrying communications, selecting the particular channel as the one channel over which to communicate the particular data packet to the receiving node.

14. The method of claim 12, further comprising:

if the determination is that the particular data packet comprises voice content to be communicated as part of a voice communication, then, responsive to the determination, the transmitting node engaging with the receiving node over just the one selected channel in a handshake process to prepare for communication of the particular data packet from the transmitting node to the receiving node over just the one selected channel, wherein the handshake process comprises the transmitting node communicating to the receiving node over just the one selected channel a ready-to-send (RTS) message for the communication of the particular data packet and, in response to the RTS message, the receiving node communicating to the transmitting node over just the one selected channel a clear-to-send (CTS) message for the communication of the particular data packet, and wherein the handshake process occurs before the transmitting node communicates the particular data packet to the receiving node over just the one selected channel.

15. The method of claim 12, further comprising:

if the determination is that the particular data packet comprises voice content to be communicated as part of a voice communication, then, after the transmitting node communicates the particular data packet to the receiving node over just one channel, the transmitting node receives from the receiving node over just the one selected channel an acknowledgement, wherein the acknowledgement indicates that the receiving node received from the transmitting node the particular data packet.

16. A wireless communication device (WCD) comprising:

one or more processors;

a non-transitory computer readable medium; and program instructions stored on the non-transitory computer readable medium and executable by the one or more processors to:

determine that data is to be communicated by the WCD, wherein the data to be communicated comprises one or more data packets, make a determination of whether at least a particular data packet of the data comprises voice content to be communicated as part of a voice communication, control whether the WCD communicates the particular data packet over just one channel or rather over multiple channels, wherein the controlling is based on the determination of whether the particular data packet comprises voice content to be communicated as part of a voice communication, wherein the controlling includes (i) if the determination is that the particular data packet comprises voice content to be communicated as part of a voice communication, then, responsive to making the determination, causing the WCD to communicate the particular data packet over just one channel rather than communicate the particular data packet over two or more channels, and (ii) if the determination is that the particular data packet does not comprise voice content to be communicated as part of a voice communication, then, responsive to making the determination, causing the WCD to communicate the particular data packet over two or more channels rather than communicate the particular data packet over just one channel.

17. The WCD of claim 16, wherein the program instructions are further executable to:

if the determination is that the particular data packet comprises voice content to be communicated as part of a voice communication, then, responsive to making the determination, select from among a plurality of channels that are available for the WCD to transmit the particular data packet just one channel over which to communicate the particular data packet rather than select from among the plurality of channels two or more channels over which to communicate the particular data packet, wherein communicating the particular data packet over just one channel comprises communicating the particular data packet over just the one selected channel.

18. The WCD of claim 17, wherein selecting from among the plurality of channels just one channel over which to communicate the particular data packet comprises:

determining that a particular channel from among the plurality of channels is available for carrying communication; and in response to determining that the particular channel of the plurality of channels is available for carrying communications and without also determining whether other channels from among the plurality of channels are also each available for carrying communications, selecting the particular channel as the one channel over which to communicate the particular data packet.

19. The WCD of claim 17, wherein the program instructions are further executable to:

if the determination is that the particular data packet comprises voice content to be communicated as part of a voice communication, then, responsive to making the determination and before communicating the particular data packet over just the one selected channel, cause the WCD to (i) communicate over just the one selected channel a ready-to-send (RTS) message for the communication of the particular data packet and (ii) receive, in response to the RTS message, over just the one selected channel a clear-to-send (CTS) message for the communication of the particular data packet.

20. The WCD of claim 17, wherein the program instructions are further executable to:

if the determination is that the particular data packet comprises voice content to be communicated as part of a voice communication, then cause the WCD to, after communicating the particular data packet over just one channel, receive over just the one selected channel an acknowledgement, wherein the acknowledgement is responsive to communication of the particular data packet.

* * * * *